(No Model.) 2 Sheets—Sheet 1.

W. C. BRAY & G. VAN HORNE.
RIVET SETTING MACHINE.

No. 429,334. Patented June 3, 1890.

Witnesses:
Henry H. Kendall.
Walter E. Lombard.

Inventors:
William Claxton Bray.
George Van Horne,
by N. P. Lombard
Attorney.

(No Model.) 2 Sheets—Sheet 2.

W. C. BRAY & G. VAN HORNE.
RIVET SETTING MACHINE.

No. 429,334. Patented June 3, 1890.

Witnesses:
Henry H. Kendall.
Walter E. Lombard.

Inventors:
William Claxton Bray,
George Van Horne,
by N. C. Lombard
Attorney.

UNITED STATES PATENT OFFICE.

WILLIAM C. BRAY, OF NEWTON, AND GEORGE VAN HORNE, OF EAST MILTON, MASSACHUSETTS, ASSIGNORS TO THE TUBULAR RIVET COMPANY, OF NEW HAVEN, CONNECTICUT.

RIVET-SETTING MACHINE.

SPECIFICATION forming part of Letters Patent No. 429,334, dated June 3, 1890.

Application filed January 30, 1890. Serial No. 338,577. (No model.)

*To all whom it may concern:*

Be it known that we, WILLIAM C. BRAY, of Newton, in the county of Middlesex and State of Massachusetts, and GEORGE VAN HORNE, of East Milton, in the county of Norfolk and State of Massachusetts, have invented a new and useful Improvement in Rivet-Setting Machines, of which the following, taken in connection with the accompanying drawings, is a specification.

Our invention relates to rivet-setting machines, and is designed especially for use on machines for setting rivets in leather, cloth, rubber, or other similar materials.

Our invention consists in certain novel features of construction, arrangement, and combination of parts, which will be readily understood by reference to the description of the drawings forming a part of this specification, and to the claim hereinafter given, and in which our invention is clearly pointed out.

Figure 1:
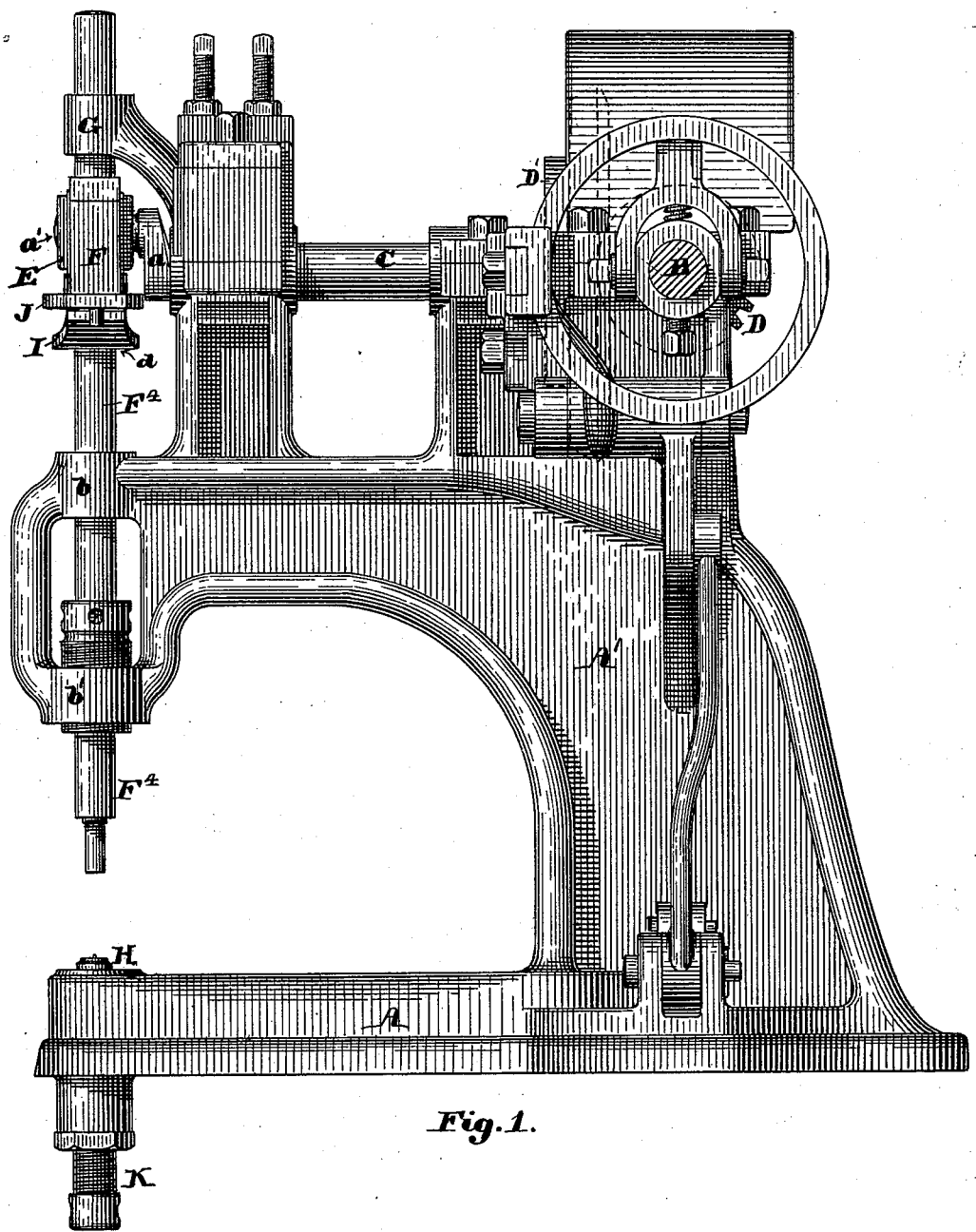
Figure 2:
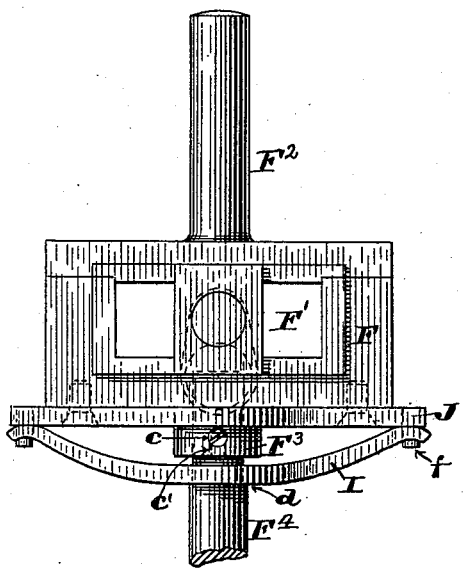
Figure 3:
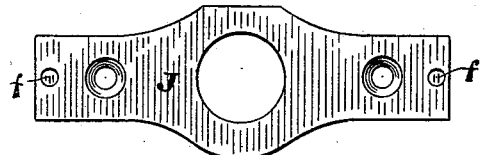
Figure 4:
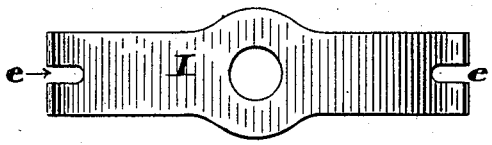

Figure 1 of the drawings is a side elevation of so much of a power rivet-setting machine as is necessary to illustrate our invention. Fig. 2 is a front elevation of so much of the setting-plunger and its accessories as is necessary to a clear understanding of one form of our invention. Figs. 3 and 4 are details to be hereinafter referred to; and Fig. 5 is a sectional side elevation of the parts necessary to illustrate another form of our invention.

In the drawings, A is the bed of the machine, supporting the goose-neck or arm A', upon which are supported in suitable bearings the driving-shaft B and plunger-operating crank-shaft C, arranged at right angles to each other and connected by bevel-gears D and D', as shown partly in dotted lines in Fig. 1.

Figure 5:
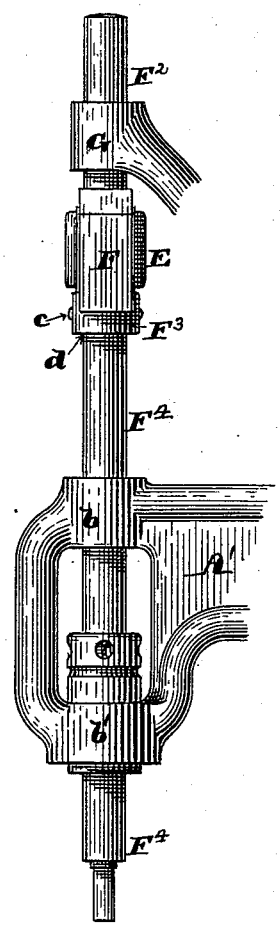
Figure 5:
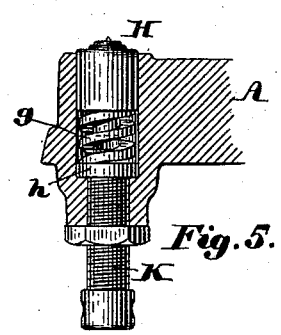

The shaft C has formed upon or secured to its front end the crank $a$, provided with the crank-pin $a'$, upon which is fitted the block E, mounted and movable horizontally in the slot F' of the yoke F, which is made in two parts secured together by bolts or screws, the upper or cap portion having formed thereon the spindle or stem $F^2$, which has a bearing in the stand G, and the lower portion has formed thereon the boss or hub $F^3$, in a hole in which is fitted the setting-plunger $F^4$, which has bearings in the front end of the arm A' at $b$ and $b'$, as shown in Figs. 1 and 5.

Heretofore in the construction of machines of this class this setting-plunger has been set in a fixed position in said yoke, or so as to be movable therewith, but not movable relative thereto, as shown in Fig. 5, and the anvil H was set in a fixed or unyielding position in the front portion of the bed A, although it was capable of being adjusted vertically to adapt its distance from the end of the setting-plunger to the requirements of different classes of work; but when once adjusted it was immovable, and all the rivets set would of necessity be compressed to the same dimensions regardless of the variations in thickness or density of the material. Our invention obviates this difficulty by so mounting the setting-plunger and anvil that one or both may yield when the pressure applied thereto exceeds what is required to properly clinch the rivet upon the material. To this end we fit the setting-plunger $F^4$ to the boss or hub $F^3$ so that it may be moved endwise therein a short distance, but cannot be rotated about its axis, said rotation being prevented by the pin $c$, fixed in said hub $F^3$ and passing through the slot $c'$ in the plunger $F^4$. We place an elliptic spring I beneath the yoke F, with its ends bearing against the under side of said yoke or the extension-plate J, secured thereto, and its center resting upon a shoulder $d$, formed upon said plunger at the proper distance below the hub $F^3$, as shown in Fig. 2. The spring I has formed in each end an open slot $e$, which receives a pin $f$, set in the under side of the yoke or the plate J, said pins serving to prevent the spring moving about the axis of said plunger.

The anvil H is adjustable vertically by the set-screw K, and may rest directly thereon, or it may rest upon a heavy spiral spring $g$, the lower end of which rests upon the disk $h$, which in turn rests upon the set-screw K, as shown in Fig. 5.

The yielding plunger $F^4$ and spring I may be used with a non-yielding anvil, or the yielding anvil may be used with the nonyielding-plunger, or both anvil and plunger may be made yielding, care being taken to make the springs of the requisite stiffness; hence we do not wish to be limited in our claim to a yielding plunger or to a yielding anvil alone.

The plate J may be made separate from or form a part of the yoke F, as may be preferred, it being only to increase the length between the bearings of the spring I, in order that a spring of suitable length could be applied to machines already constructed and having yokes of insufficient length for the desired length of spring, and therefore the plate J is to be considered as an integral part of the yoke and not a separate element.

What we claim as new, and desire to secure by Letters Patent of the United States, is—

The combination, in a rivet-setting machine, of the slotted yoke F, the revolving crank $a$, shaft C, the crank-pin $a'$, the block E, the plunger $F^4$, provided with the shoulder $d$ and movable endwise in its bearing in said yoke, and the elliptic or leaf spring I, bearing at each end against the under side of said yoke and at its middle upon the shoulder $d$ on said plunger.

In testimony whereof we have signed our names to this specification, in the presence of two subscribing witnesses, on this 27th day of January, A. D. 1890.

WILLIAM C. BRAY.
GEO. VAN HORNE.

Witnesses:
N. C. LOMBARD,
WALTER E. LOMBARD.